2,967,756
COMPOSITE PLASTIC-FIBROUS METAL MAT TOOL

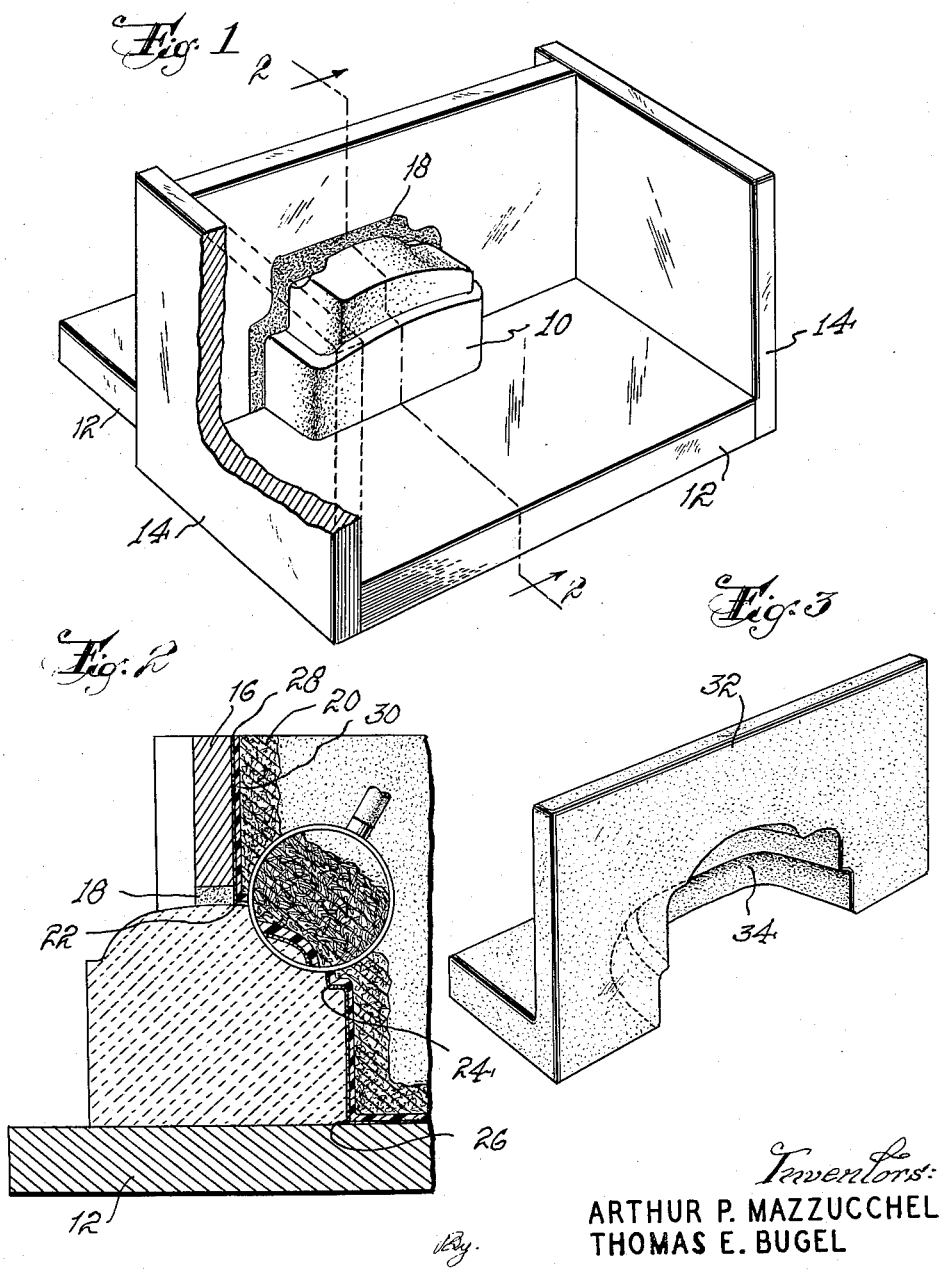

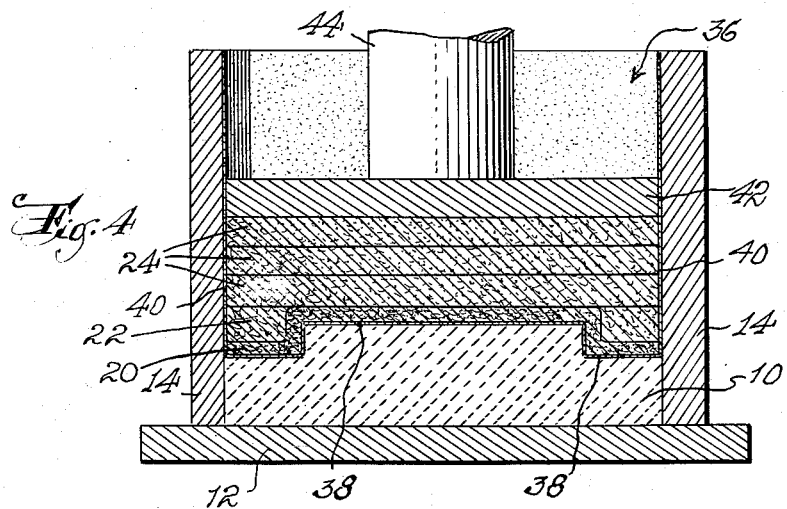
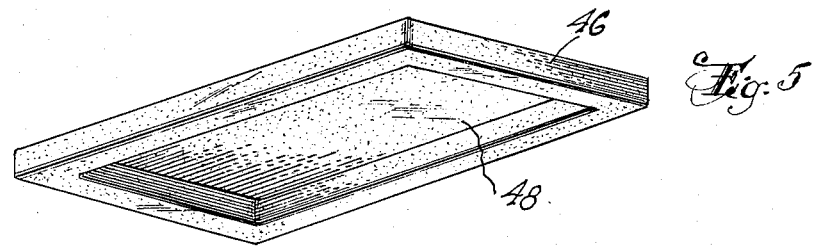
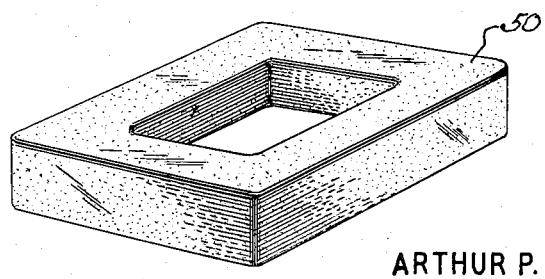
Inventors:
ARTHUR P. MAZZUCCHELLI
THOMAS E. BUGEL

Arthur P. Mazzucchelli, Scotch Plains, and Thomas E. Bugel, Montclair, N.J., assignors to Union Carbide Corporation, a corporation of New York Filed Sept. 26, 1957, Ser. No. 686,404

9 Claims. (Cl. 18—47)

This invention relates to novel composite plastic-fibrous metal mat articles. More especially, this invention relates to plastic tools prepared from metallurgically-bonded metallic filaments.

It has been realized that while various plastic compositions have many desirable properties, their use for a number of purposes has not been practicable because of certain inherent weaknesses of the plastic materials which have been used. As an example, we may mention the fact that it has been extremely difficult to cast or mold sound articles; e.g. cast or molded plastic dies and tools, with epoxy or polyester resins in thicknesses greater than about ½ inch, because of the high degree of exothermic heat generated in the interior of thick masses during the curing reaction, resulting in high internal stresses in the cast or molded objects and excessive shrinkage.

In order to overcome the just-indicated disadvantages, and to reinforce the plastic, a suggestion has been made to incorporate steel or other heat-conducting metals in wool or fiber form into the resin, the resulting resin-metal fiber mixture then being cast to form an integral metal-containing plastic die, etc.

While the suggestion has given advantageous results in many cases, it has been found that only limited success is attained, e.g., when articles having abrupt changes of wearing surface, such as edges and corners, are made in accordance therewith. It is believed that the reason for this lack of success is that the resiliency, i.e. springiness, of the metal wools and long fibers causes them to bridge over those places where the surface changes abruptly, such as at corners; and consequently the metallic material does not reach into the relatively inaccessible sections. The resulting absence of metal reinforcement then permits the resin to flow into the affected sections, thereby resulting in resin-rich or unsupported areas which are characterized, e.g. by lack of homogeneity in appearance and properties, and by the absence of the desired high impact resistance, thermal conductivity, and wear and abrasion resistance.

The aforesaid suggestion to incorporate steel or other heat-conductive metals in unformed wool or fiber form into the resin has certain other disadvantageous results. Among these may be mentioned the following:

(1) A relatively high pressure in excess of 300 pounds is required to achieve a high metal content composition.

(2) It is difficult to obtain orientation of the metal fibers where uniform strength in all directions is desired.

(3) The metal fibers occupy considerable volume per unit weight and this high bulk factor necessitates an excessively high mold build-up to allow for loading sufficient metal.

(4) Careful loading of the mold and distribution of the fibers is necessary, especially when there are sharp variations of contour. In spite of the care exercised, metal-poor areas still result as aforesaid.

(5) Abrasion of the mold parting coat during compression of the metal fibers has been noted, particularly on vertical or nearly vertical surfaces.

(6) In those cases where a surface coating of metal fibers and resin is applied, e.g., by flocking procedure, to improve the homogeneity of the working surface of the resulting articles and metallic wools are employed to fill the mold cavity, there has been observed a tendency for the flocked surface coating to be wiped away during the compression of the mass.

(7) Metal fibers in forms now available commercially present a difficult storage problem due to the aforementioned high bulk factor.

(8) In addition to the effect of excessive spring-back already noted with respect to those surfaces having abrupt changes of contour, this characteristic of unformed metallic filaments also is disadvantageous because a large press day-light and long stroke are required.

The foregoing disadvantages of metal fiber-plastic composites have been overcome in accordance with this invention wherein we provide a composite article which comprises mats of metallurgically-bonded metallic filaments in a thermoset plastic matrix.

In addition to the aforesaid advantages of the articles made in accordance with the present invention, we have found that their thermal conductivity has been unexpectedly and markedly increased. By this statement we mean that articles prepared in accordance with our invention possess appreciably higher thermal conductance than articles prepared from the same unformed metal fibers and resins, the proportions of the composite and the processing conditions being the same.

In general, the essential step in carrying out our process is to impregnate, e.g. by soaking or brushing, a mat of metallurgically-bonded fibers with a suitable resin plus catalyst or hardener, if required, and to press, e.g. under a pressure from 1 to 300 p.s.i. the so-saturated mat against a pattern having a surface to be simulated so as to insure faithful reproduction of detail, permitting the resin-metal fibers composite to form a consolidated mass under adiabatic conditions.

If desired, as in the case of dies, the mold cavity may be filled with a suitable "backing" material as hereinafter defined, prior to permitting the composite to form a consolidated mass.

While the present process has the desirable characteristic that it can be used without elaborate preparation of the surface coating, as, e.g. without the aforementioned flocking procedure, nevertheless, the present process is flexible enough to be used in conjunction with such a surface coating procedure, if desired.

The metallic filaments useful in accordance with this invention are not confined or limited to any particular metal or combination of metals. Among the specific metallic materials which can be used we mention steel fibers, copper fibers, silver fibers, stainless steel fibers, nickel fibers, and aluminum fibers, as well as alloys such as brass or bronze in fiber form. If desired, the metallic material may take the form of solid plastic fibers or glass fibers to whose surfaces have been imparted, by dipping, spraying or similar means, a coat of heat-conducting medium such as silver, aluminum or copper.

The metallic filaments may be spun, extruded, cut or drawn filaments, either of round, rectangular, or other cross-sectional form. They may be smooth, rough or crimped.

The lengths of the filaments are appreciably greater than their diameters or cross-sectional dimensions. The individual filaments may be of any desired size, e.g. from about 1/32 inch in length up to 7 to 8 feet, or even a substantially continuous length of 100 feet or more. The cross-sectional dimensions may also vary over wide limits, but in general, in the case of round fibers, we presently prefer those having diameters between about 0.0005 inch and 0.025 inch. In the case of rectangular fibers, we presently prefer those having cross-sectional areas equivalent to the aforedescribed round fibers. If desired, the aforementioned metallic filaments may be used in the form of "wool," e.g. the well-known steel wool, copper wool, etc. of commerce in which the fibers are of substantially continuous length.

The term "mat" as used herein is used without limitation as regards the shape of the mass or the arrangement of the fibers therein. Thus, mats may be rectangular, disk-shaped, band-shaped, cup-like, or any other desired form. The fibers may be arranged in aligned condition, e.g. by being oriented along their lengths, or in unaligned condition, e.g. intertwined or interlocking.

As aforesaid, the metallic material is used herein in the form of mats of metallurgically-bonded fibers or filaments. By the term "metallurgically-bonded fibers" as used in the specification and claims, is meant a mass of fibers, a sufficient number of which are joined to each other by a bond strength great enough to overcome the inherent spring-back characteristics of the individual fibers so as not only to permit the mass to be shaped by ordinary hand pressure so as to conform to a desired configuration, but also to permit the thus-shaped mass to retain said configuration.

The metallurgical-bonding of metal fibers may be effected in any known manner. Examples of methods of effecting such bonding include those involving sintering at high temperature of felted fibers which have been dispersed in a suitable liquid or which contain some lower melting metal or alloy, such as copper or bronze. Also, a plating technique such as electroplating and the Kanigen nickel plating technique may be used to form a metallurgical bond. Other methods suitable for such purpose involve the use of metal vapors in a vacuum.

The sintering method of metallurgically-bonding metal fibers involves a procedure similar to paper making, i.e. dispersing the fibers in a suitable medium, e.g. glycerol or ethylene glycol, or water containing a rust inhibitor, forming a mat of such fibers by collecting them on a screen, under pressure or vacuum, washing the mats with, for example, water or alcohol, drying the mats, and then sintering the dried mats by heating, as for example in the instance of low-carbon steel fibers for about 15 minutes to 2 hours at 2100° F.–2500° F. The density of the mats can be varied by the amount of pressure applied to the mats either before or after sintering. In the instance of steel fiber, a pressure of 1 ton per square inch results in a mat of high porosity, i.e., 80 percent, whereas a pressure of 15 tons per square inch will result in a dense mat, i.e.. 10 percent porosity. We presently prefer to employ mats having a porosity between about 75 percent and about 95 percent, as such mats are more easily formed at low pressures.

The use of electroplating to form a metallurgically-bonded fiber mat involves preparing a mat by blowing chopped metal fibers about ⅛ inch to ⅜ inch in length into a mold, compressing the fibers at 300 to 2000 p.s.i., degreasing the formed mat with e.g. trichloroethylene, then placing the degreased mat into an electroplating bath to give a flash coating of copper (from about 10 to 15 minutes for a coating thickness of .0015 inch to .002 inch). This treated mat is then immersed in a cleaning bath and then in a nickel plating bath for about 2 hours to give a nickel coating of about .0015 inch to .002 inch as well as forming a nickel bond at the points of contact of the metal fibers. A mat prepared in this manner had a porosity of about 75 percent.

The mats as used in accordance with this invention are sufficiently pliable to lend themselves to be conformed to any desired shape under slight pressure, e.g., hand pressure. In those cases where there are abrupt changes of surface the mats can be cut so as to conform to such changes. After being conformed to the desired configuration, the mats substantially retain the altered shape without any material spring-back or other undesired manifestation.

As regards the thickness of the mats employed in accordance with our invention, this may vary widely, depending, in general, on the article to be formed. We have found that mats having thicknesses as low as 0.005 inch and as high as 1 foot can be used; but it is understood that these are not to be regarded as strict limits. In general we find that mats of thickness between about ⅛ inch and about 2 inches are the most desirable, especially from the practical point of view.

The resin employed in accordance with this invention is a thermosetting resin selected from the class consisting of epoxy resins and polyesters.

The epoxy resins of commerce today can be divided into two broad classes of resin: liquid resins and brittle solid resins.

Chemically, the two classes of epoxy resins are similar enough that a generalized formula can be written for both as follows:

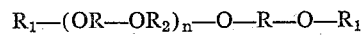

$$R_1-(OR-OR_2)_n-O-R-O-R_1$$

where R is the residue of a polyhydric phenol, $R_2$ is an intermediate hydroxyl containing residue of a chlorohydrin or dichlorohydrin, and $R_1$ is mainly an epoxy-containing residue and to some extent a hydroxyl-containing residue derived from the chlorohydrin. In the above formula $n$ represents the extent of polymerization.

We regard as liquid epoxy resins or as low melting solid epoxy resins those having a value of $n$ from 0 to about 1. We regard as brittle solid epoxy resins those having a value of $n$ from about 2 to about 20.

The polyhydric phenols used in making the epoxy resins may contain the hydroxy groups in one nucleus, as in resorcinol, or in different nuclei of either fused ring systems or ring systems connected by chains composed of one or more atoms. Illustrative of polyhydric phenols which may be used in making the complex polymerization products are mononuclear phenols such as resorcinol, hydroquinone, phloroglucinol, etc., and polynuclear phenols such as bisphenol A, p,p'-dihydroxy benzophenone, p,p'-dihydroxy diphenyl, p,p'-dihydroxy dibenzyl and the polyphenylols obtained by the reaction of monohydric mononuclear phenols with an unsaturated aldehyde, e.g. acrolein.

The difunctional or polyfunctional chlorohydrins used in making the epoxy resins include epichlorohydrin, glycerol dichlorohydrin, and the like.

The curing of epoxy resins may be divided into two classes—curing with hardeners and curing by catalysts. Hardeners are defined as polyfunctional compounds which are used with an epoxy resin in a stoichiometric or near stoichiometric ratio. Illustrative of hardeners are polyhydric phenols such as resorcinol, bisphenol A and the like; polybasic acids or their anhydrides such as maleic anhydride, phthalic anhydride, etc.; polyamines containing an active amino hydrogen such as ethylene diamine, diethylene diamine, etc.; polyhydric alcohols and polythiols. Catalysts are defined as compounds that cause the epoxy to self-polymerize. They may be monofunctional and are always used in much lower amounts than stoichiometric. Illustrative of catalysts are the amines, such as trimethyl amine, triethyl amine, etc., alkalies and alkaline reacting substances, such as sodium or potassium hydroxide, etc., boron trifluoride, and a variety of others.

In addition to the liquid epoxy resins of the kind described, there have also been found suitable to our purpose the diepoxides such as those described in U.S.P. 2,716,123; 6-methyl-3,4-epoxycyclohexylmethyl-6-methyl-3,4-epoxycyclohexane carboxylate, being illustrative, and the triepoxides described in U.S.P. 2,801,989.

The unsaturated polyester compositions suitable for our purpose are the esterification products of ethylenically unsaturated dibasic acids or their anhydrides, such as fumaric acid and maleic anhydride, or mixtures of such acids or anhydrides with saturated acids or anhydrides, such as adipic acid and phthalic anhydride with polyvalent alcohols, usually glycols such as ethylene and diethylene glycol. These polyesters are quite readily soluble in styrene and other vinyl monomers to form resin syrups which in the presence of catalysts and activating agents will polymerize either at room temperature or by the application of heat and slight pressure to solid infusible plastic. The polymerization is exothermic and no volatile by-products are formed. Pure glycol maleate-styrene copolymer is rather brittle, but using longer glycols or by replacing part of the maleic acid with long chain aliphatic acids such as adipic acid a tougher and more flexible resin is obtained.

The vinyl monomer in the above compositions can be diallyl phthalate which is often used to cross-link the modified maleate polyester resins.

Suitable catalysts for unsaturated polyester compositions as above described are free radical initiators such as peroxides and azo compounds, such as benzoyl peroxide, tertiary butyl perbenzoate, methyl ethyl ketone, peroxide, and the like. Since most unsaturated polyester compositions are unstable on storage, they usually are marketed in the liquid form and contain a stabilizing inhibitor such as tertiary butyl catechol, hydroquinone and the like. The curing catalyst is then added just prior to the intended time of using the polyester compositions.

In addition to the aforesaid mats and resins, other materials may be used, if desired, in accordance with our invention. Examples of such other materials include stabilizers, mold release agents or lubricants, plasticizers, dyes, colored pigments, stainless steel flake, iron or aluminum oxides, iron-powder, fine silica, and commercially available typical plastic tooling resins (compounded with or without fillers).

Also, as in the case of dies, molds for bag molding fiber glass reinforced plastic laminates, foundry patterns, core boxes, vacuum form molds, jigs, and other structures, may be made in accordance with the present invention by employing suitable "backing" materials. Examples of such materials include wood, reinforced plastic, welded metal or other egg crate type structures, any moldable plastic material, mixtures of plastics, e.g. epoxy and polyester resins and unwoven metallic filaments and formed plastics. Also, if desired, the mold or dies can be completely or partly built-up by the use of a plurality of impregnated mats as herein described. In other words, the resin impregnated mats of metallurgically-bonded metal filaments may also serve as a "backing" material.

The term "backing" material, as used herein, is intended to cover all that part or those parts of articles made in accordance with the present invention, wherever the context so admits or requires, which do not involve a "working surface" as hereinafter defined.

As used herein, the term "working surface" refers, wherever the context so admits or requires, to that surface or those surfaces of the articles made according to this invention which gives or give the desired form to articles made therefrom in the case of dies, punches, molds, etc., or which are employed for purposes of checking fixtures etc., in the case of shell-like composites.

The proportion of metallic material and resin in the compositions of this invention may vary widely, depending on the materials employed and the articles desired. Sufficient metal should be present to improve materially the thermal conductivity, and sufficient resin to knit the mass together upon curing to form a consolidated mass of good strength should be used. While the proportions stated presently are not critical we presently prefer to employ a proportion of metal from about 7 percent to about 60 percent by volume, of the total composition, and a proportion of resin from about 40 percent to about 93 percent, by volume, on the same basis. Compositions having higher metal contents may be made by impacting the mats, either prior or subsequent to impregnation, by any suitable means, such as with an air hammer or by using vacuum bag molding technique.

All of the plastic tools made in accordance with this invention are characterized by the fact that they are smooth, hard, uniform in properties, accurately conform to the desired configuration, having high impact-, wear-, and abrasion-resistance, high thermal conductivity and dimensional rigidity or stability, and can be drilled, machined, turned, filed, sawed, polished, and finished much like a metal article, only easier. The composites which are shell-like may be dense or relatively porous, depending on whether there has been compacting or not, as aforesaid.

The following table indicates the superior thermal characteristics of articles made in accordance with the present invention in comparison with those made from unformed fibers.

TABLE I

| Percent Steel in Final Comp. | Thermal Conductivity, B.t.u./hr./ft.²/° F./in. | |
|---|---|---|
| | Unformed fibers | Present Invention |
| 68 | 26 | 51.2 |
| 71 | 29 | 69.0 |
| 86 | 45 | 162.5 |

As the table shows, an increase in metal content of 18 percent results in an increase of about 70 percent in thermal conductivity when using unformed metal fibers and an increase of more than three times, i.e. 217 percent when employing formed mats in accordance with this invention.

In order further to illustrate our invention, the following detailed description, taken in connection with the accompanying drawings in which like numbers represent like parts throughout, and which form a part hereof, is given:

In the drawings:

Fig. 1 is a perspective view, partly broken away, showing a terminal box stamping fixture whose surface is to be simulated by a preferred embodiment of this invention;

Fig. 2 is a part cross-section, taken along the line 2—2 of Fig. 1, showing a mat of metallurgically-bonded steel fibers in place along the surface of the fixture which is to be simulated, part of the mat being shown in magnification;

Fig. 3 shows the finished terminal box stamping checking fixture made from the fixture of Fig. 1;

Fig. 4 is a partial vertical section of apparatus and materials used in making another embodiment of our invention;

Fig. 5 is a die made with the apparatus and from the materials shown in Fig. 4; and Fig. 6 is a perspective view showing another embodiment of our invention, namely, a die insert for making steel stampings.

*Example 1*

PREPARATION OF A CHECKING FIXTURE

With particular reference to Figs. 1, 2, and 3, a wooden die model or pattern 10, having a configuration corresponding to that of the articles to be checked, in this case terminal box stampings, by the "working surface" of the fixture made in accordance with our invention, is secured to a suitable base 12. If desired, the pattern 10 may be made of hemp-reinforced plaster cast phenolic resin or epoxy or polyester laminate.

A mold build-up, defining the dimensions of the tool to be made, is next constructed with walls 14. A template 16 is then anchored in place so as to bisect the pattern 10 vertically and longtiudinally. A thermosetting resin, such as a suitably catalyzed epoxy resin 18, e.g. a diglycidyl ether of bisphenol A with diethylenetriamine as a hardener, is applied to anchor the template 16 to the pattern 10. Any excess of resin is removed after hardening by grinding flush with the template 16.

A sintered mat 20 comprising 4.5 percent low carbon steel, by volume, and 3/16 inch thick, was made by dispersing steel fibers about 1/4 inch long and 3 to 5 mils in thickness in glycerine, forming a mat of the wetted fibers on a 60 mesh steel screen, by application of 20 inches of vacuum, then washing the collected fibers with alcohol and drying the washed fibers at 60° C. for 4 hours, finally heating the dried fibers at 2100° F. for about 45 minutes in a hydrogen atmosphere.

The sintered mat 20 was placed against the pattern 10, base 12, and template 16 so as to conform to the contours (see Fig. 2). Light hand pressure was enough to cause the mat to be compressed to 8 percent steel by volume and to be deformed so as to conform to the contours. At abrupt changes of surface, such as at the template-pattern junction 22, corner 24 of the pattern, and the pattern-base junction 26, the mat 20 was slit and the ends were lapped against the form so as to insure substantially continuous coverage of the surface to be simulated.

The thus-formed mat 20 was removed from the pattern 10 and two coats of a suitable mold release agent, such as a silicone base material, e.g. that sold by Chemical Development Corp. under the designation CD-B2 were applied to all the parting surfaces of the pattern 10, walls 14 and template 16, as shown in Fig. 2, leaving a 1-2 mil coating 28.

A thin layer of an epoxy resin 30 having the following composition was brushed over the mold release coating 28:

100 parts by weight of a fluid polymerizable glycidyl ether of bisphenol A epoxy resin (ERL-2774, Bakelite Co.)
22.5 parts by weight of a mixture of 37.2 parts by weight of diethylene-triamine, 36.4 parts by weight of acrylonitrile diethylenetriamine adduct, and 26.4 parts by weight of a 1 hydroxyethyl-2-heptadecanyl glyoxalidine (ZZL-0812, Bakelite Co.)

The foregoing resin-hardener composition was brushed liberally on to one side of the mat 20. The mat absorbed the resin readily and in a few (about 5) minutes the resin reached through to the uncoated side, showing that the mat 20 was completely impregnated.

The resin-saturated mat was now placed against the pattern 10 and full hand pressure was exerted against the mat to insure that it made complete contact with the surfaces to be simulated. Once this condition had been obtained, the hand pressure on the mat 20 was released.

The resin 30 was allowed to cure at room temperature. After 2 hours the resin had become soft and gummy. At this point the mat was pressed again by hand in order to insure faithful reproduction of the surface to be simulated. After 8 hours the fixture 32 (Fig. 3) was cured completely and it was removed from the pattern 10. It was found to have 37.2 percent steel by weight and the balance was resin.

The fixture 32 was found to have a working surface 34 conformed exactly to the configuration of the pattern 10. The fixture was hard, had high thermal conductivity, high impact strength, and had all the other desired features noted hereinabove with respect to the articles of this invention. The fixtures showed little change in dimensional stability after exposure to 95 percent humidity at 140° F. 48 hours followed by 16 hours at 250° F. in a dry oven.

A fixture made in accordance with the foregoing but with improved heat resistance was made by using a resin prepared as follows in place of that given in the foregoing example. The resin was prepared by mixing together at a temperature of 100° F. the following:

Three moles of 3,4-epoxy-6-methylcyclohexylmethyl-3,4-epoxy-6-methyl-cyclohexane carboxylate, 3 moles of maleic anhydride, and 1 mole of glycerol, a liquid thermosetting resin being obtained.

A fixture having the aforestated desirable properties and also possessing greatly improved heat resistance than that possessed by the fixture of Example 1 can be made by following the procedure of this example except for the following changes:

(1) The resin employed has the following composition:

100 parts by weight ERL-2774
19 parts by weight of a hardening mixture consisting of—
    57 parts by weight of meta phenylene diamine
    37 parts by weight of methylene dianiline
    6 parts by weight of bisphenol A (ZZLA-0801, Bakelite Co.)

(2) The fixture 32 was cured at 100° C. for 2 hours and at 150° C. for 4 hours after first being permitted to cure under adiabatic conditions for 12 hours. The elevated temperature was obtained by conventional means, heat lamps and large ovens being especially satisfactory.

Such fixtures having improved heat resistance are especially useful for applications where heat is present, as in welding, and where both heat resistance and thermal conductivity are important.

Example 2

PREPARATION OF A DIE

The accompanying drawings, Figs. 4 and 5, illustrate the making of a die in accordance with this invention.

The pattern 10, which was 4 inches thick, was secured to a base 12 and mold side walls 14, as set forth in Example 1. All of the surfaces defining the cavity 36, i.e. the surface 38 of the pattern to be simulated and the interior surfaces 40 of the mold side walls 14 were twice coated with a mold release agent, as in Example 1 and the sintered mat 20 is conformed to the pattern surface 38 and is impregnated with the resin composition of Example 1 as stated therein. A second, sintered metal mat 22 was cut to fit around the periphery of the lower portion of the pattern 10 and after impregnation with the same epoxy was placed above the tailored mat 20 as shown in Fig. 4. Then the cavity 36 was filled with additional layers of epoxy impregnated sintered metal mats 24 saturated as in Example 1.

A pressure plug 42 made from 3/4 inch thick steel plate or hardwood faced with aluminum plate was inserted on top of the entire charge in the mold, and a pressure of about 300 pounds per square inch was slowly applied for about 30 minutes by means of the ram 44. Curing was allowed to take place under adiabatic conditions for about 12 hours, the pressure being maintained throughout this cure.

The casting 46, after removal from the mold assembly was found to have a "working surface" 48 which conformed to that of the pattern surface 38. It possessed the desirable properties of the fixture 32 of Example 1.

Example 3

PREPARATION OF A DIE INSERT

Following the procedure of Example 2 a die insert 50 as shown in Fig. 6 was made, using a sintered mat which had been prepared as given below, and an epoxy resin being the same as the second epoxy resin described in Example 1.

The sintered mat was prepared by dispersing 1/4 inch SAE 1010 steel fibers in ethylene glycol, forming a mat of wetted fibers on a 60 mesh steel screen, by application of 20 inches vacuum, then washing the collected fibers with alcohol, drying the washed fibers at 60° C. for 4 hours, and finally, heating the dried fibers at 2100° F. for 40 minutes in an inert atmosphere, i.e. in the presence of hydrogen. The mat had a metal content of 5 percent by volume, or stated otherwise, a porosity of 95 percent and a thickness of ½ inch.

As before, the sintered mat was tailored by hand to fit the mold. The impregnation of the mat was conducted at 80° F.–100° F. for 30 minutes until the mat was fully saturated. Five layers of saturated mats were used to give the desired build-up.

A pressure of 300 p.s.i. was applied to the build-up which was allowed to cure for 18 hours by means of the exothermic heat developed, after which a post cure of 2 hours at 140° F. and 2 hours at 300° F. was given.

The resulting die insert consisted of 68 percent metal fiber and 32.0 percent epoxy resin by weight.

The die insert possessed the aforementioned desirable properties of articles made in accordance with this invention. It was 2¼ inches in length, 9/16 inch high, 2 inches in width, and had an opening of 1 1/16 inches by 1 5/16 inches.

The die insert gave excellent performance when tested for drawing 22 gage steel. It was used for making 22 gage SAE 1010 steel stampings. It resisted surface erosion and showed less surface and radius wear and dimensional change after 2000 stampings than a corresponding die made from unsintered preforms of annealed steel fibers.

If desired, the epoxy resin employed in the foregoing examples may be replaced with polymerizable polyesters as already defined, e.g., a catalyzed styrenated maleic anhydride ethylene glycol polyester. In such case, the curing cycle employed should be that suitable for the resin used. Also, in place of the steel fibers of the examples the other metal fibers specified herein may be used.

Also, if desired, the mat may be prepared by loading a die mold with metal fibers of any size and compressing them to a dense preform having the conformation of the die. This preform can then be sintered as previously described to form a metallurgically-bonded preform which can be impregnated with resin. Such a structure can then be cured without returning it to the mold or without application of pressure to produce an acceptable die for metal stamping.

It will be appreciated by those skilled in the art that the physical properties of the metallic fibers in the sintered mat can be modified or improved by subjecting the sintered mat prior to impregnation to such treatments as annealing, carburizing, cyaniding, nitriding, and tempering.

While we have described our invention in detail in its preferred embodiments, it will be obvious to those skilled in the art, after understanding our invention, that various changes and modifications may be made herein without departing from the spirit or scope thereof. We aim in the appended claims to cover all such modifications and changes.

What is claimed is:

1. A dimensionally rigid plastic tool comprising a thermoset consolidated mass of a mat of metallurgically-bonded metallic filaments in a matrix derived from a thermosetting resin selected from the group consisting of epoxy resin and polyester resin, said consolidated mass of metallic filaments and matrix including the tool working surface, said mat of metallurgically-bonded metallic filaments conforming to the tool working surface, said matrix containing a sufficient quantity of said filaments to improve the thermal conductivity of said article materially.

2. The plastic tool of claim 1 wherein a thermosetting epoxy resin is used.

3. The plastic tool of claim 2 wherein a sintered mat of steel filaments is used.

4. The plastic tool of claim 3 wherein the proportion of steel filaments is within the range from about 7 percent to about 60 percent by volume and the proportion of said thermosetting epoxy resin is within the range from about 40 percent to about 93 percent by volume.

5. A plastic tool comprising a dimensionally rigid body including as the tool working surface a thermoset consolidated mass of a preformed mat of metallurgically-bonded metallic filaments essentially conforming to the tool working surface impregnated with a matrix derived from a thermosetting resin selected from the group consisting of epoxy resin and polyester resin, said consolidated mass containing a sufficient quantity of said filaments to improve the thermal conductivity of said article materially.

6. The plastic tool of claim 5 wherein sintered metal fiber mats are used.

7. The plastic tool of claim 6 wherein a thermosetting epoxy resin is used.

8. The plastic tool of claim 7 wherein a sintered mat of steel filaments is used.

9. The plastic tool of claim 8 wherein the proportion of steel filaments is within the range from about 7 percent to about 60 percent by volume and the proportion of said thermosetting epoxy resin is within the range of from about 40 percent to about 93 percent by volume.

References Cited in the file of this patent

UNITED STATES PATENTS

| | | |
|---|---|---|
| 1,853,385 | Spade | Apr. 12, 1932 |
| 2,099,047 | Bradshaw | Nov. 16, 1937 |
| 2,441,548 | Sperry | May 11, 1948 |
| 2,479,364 | Jocelyn | Aug. 16, 1949 |
| 2,682,515 | Naps | June 29, 1954 |
| 2,706,832 | Frost et al. | Apr. 26, 1955 |